United States Patent [19]

Saito

[11] Patent Number: 5,295,223
[45] Date of Patent: Mar. 15, 1994

[54] VOICE/VOICE BAND DATA DISCRIMINATION APPARATUS

[75] Inventor: Kazuo Saito, Hyogo, Japan

[73] Assignee: Mitsubishi Denki Kabushiki Kaisha, Tokyo, Japan

[21] Appl. No.: 706,204

[22] Filed: May 28, 1991

[30] Foreign Application Priority Data

Oct. 9, 1990 [JP] Japan ................................. 2-271640

[51] Int. Cl.$^5$ ................................................ G10L 5/00
[52] U.S. Cl. ................................ 395/2.23; 395/2.22; 395/2.2; 395/2.1; 395/2
[58] Field of Search ................ 395/2; 381/61, 35, 36, 381/43, 46, 61; 84/603; 370/81

[56] References Cited

U.S. PATENT DOCUMENTS

| Re. 31,172 | 3/1983 | Nishimura et al. | 381/36 |
| Re. 33,739 | 11/1991 | Takashima et al. | 84/603 |
| 3,985,956 | 10/1976 | Monti et al. | 381/46 |
| 4,006,310 | 2/1977 | Bayer | 179/1 |
| 4,027,102 | 5/1977 | Ande et al. | 179/1 |
| 4,363,122 | 12/1982 | Black et al. | 370/81 |
| 4,700,391 | 10/1987 | Leslie, Jr. et al. | 381/35 |
| 4,761,815 | 8/1988 | Hitchcock | 381/43 |
| 4,864,622 | 9/1989 | Iida et al. | 395/2 |
| 4,903,261 | 2/1990 | Baran et al. | 370/94.2 |
| 5,007,000 | 4/1991 | Baldi | 395/2 |
| 5,027,409 | 6/1991 | Sakamoto | 395/2 |
| 5,040,219 | 8/1991 | Ando et al. | 381/61 |
| 5,082,673 | 1/1992 | Engelke et al. | 379/98 |
| 5,103,481 | 4/1992 | Iseda et al. | 381/46 |
| 5,121,349 | 6/1992 | Naito | 364/717 |

OTHER PUBLICATIONS

Ronald Schafer and Lawrence Rabiner, "Parametric Representations of Speech", Jul. 9, 1974.
Russell J. Niederjohn and Meir Lahat, "A Zero-Crossing Consistency Method for Formant Tracking of Voiced Speech in High Levels", Apr. 1985.
L. R. Rabiner et al., "Digital Processing of Speech Signals", 1978, Bell Lab, Inc., Prentice-Hall, Inc. pp. 116-171.

*Primary Examiner*—Allen R. MacDonald
*Assistant Examiner*—Tariq Kafiq Hafiz
*Attorney, Agent, or Firm*—Rothwell, Figg, Ernst & Kurz

[57] ABSTRACT

An apparatus for discriminating voice data so as to create statistical data and for discriminating voice/voice band data in digital speech interpolation and digital circuit multiplication equipment. A comparison is made between the dead zone width and the amplitude of the input signal so as to count only how many times the input signal crosses the width of each dead zone as the number of the zero crosses. Then, the sum of the absolute-value voltages of the input signal is determined and the encoding is performed based on the values corresponding to the sum thereof thus determined or the average and dispersion analysis of the values is carried out, thereby effecting the discrimination of the vowel and consonant of the voice, the tone signal and the frequency thereof, and the modulated wave. Further, the number of the crosses of the input signal to the threshold set in the form of plural steps is determined to the input signal transmitted over the telephone line. Then, the encoding is made based on the result of determination of the number of the crosses or the average and dispersion analysis of the values is performed.

8 Claims, 15 Drawing Sheets

FIG. 7 v : VOICE
T : TONE
D : VOICE BAND DATA

| CONTENTS OF SIGNAL | NUMBER OF ZERO CROSSES WITHOUT DEAD ZONE | NUMBER OF ZERO CROSSES INCLUSIVE OF DEAD ZONE | SUM OF ABSOLUTE-VALUE VOLTAGES | EXPECTED VALUE FOR IDENTIFICATION | CHARACTERISTICS OF SIGNAL |
|---|---|---|---|---|---|
| (a) VOWEL OF VOICE | MIDDLE (17) | LOW (8) | HIGH | v | VOWEL IS HIGH IN LEVEL. NUMBER OF ZERO CROSSES IS MIDDLE OR SO BUT LOW DUE TO PROVISION OF DEAD ZONE |
| (b) CONSONANT OF VOICE | HIGH (44) | HIGH (28) | LOW | v | CONSONANT IS LOW IN LEVEL. NUMBER OF ZERO CROSSES IS HIGH BUT DECREASED DUE TO PROVISION OF DEAD ZONE |
| (c) TONE | MIDDLE TO HIGH (22) | MIDDLE TO HIGH (22) | HIGH | T | TONE IS HIGH IN LEVEL. NUMBER OF ZERO CROSSES IS RANGING FROM MIDDLE TO HIGH BUT NO DECREASE IN NUMBER OF ZERO CROSSES DUE TO DEAD ZONE IS PRODUCED. NUMBER OF ZERO CROSSES IS STABLE AND THE SUM OF ABSOLUTE-VALUE VOLTAGES IS RENDERED STABLE IN HIGH LEVEL |
| (d) MODULATED WAVE | HIGH (27) | HIGH (27) | HIGH | D | MODULATED WAVE IS HIGH IN LEVEL. NUMBER OF ZERO CROSSES IS HIGH AND A DECREASE IN NUMBER OF ZERO CROSSES DUE TO DEAD ZONE IS LOW |
| (e) LOW LEVEL NOISE | HIGH (48) | LOW (3) | EXTREMELY LOW | — | NOISE IS EXTREMELY LOW IN LEVEL. NUMBER OF ZERO CROSSES IS HIGH BUT DECREASED DUE TO PROVISION OF DEAD ZONE |

FIG. 10
(a) VOWEL OF VOICE
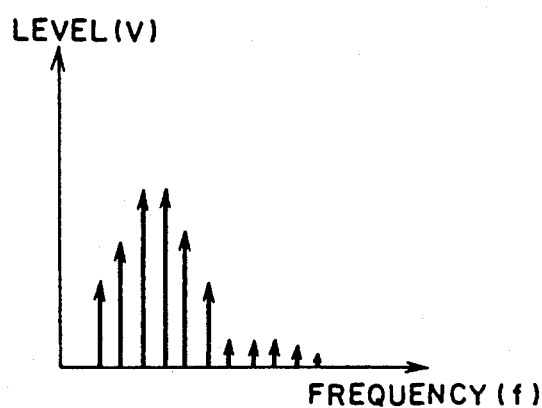
(b) CONSONANT OF VOICE
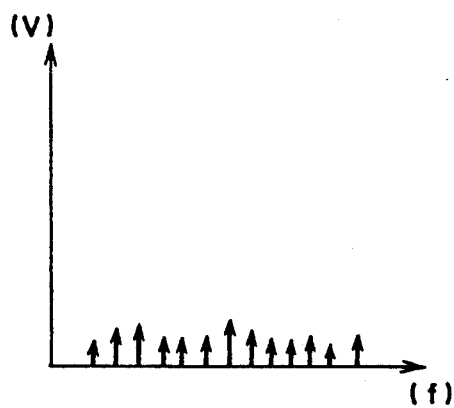
(c) VOICE BAND DATA
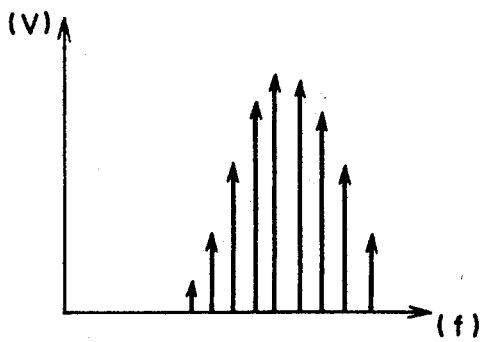
(d) TONE
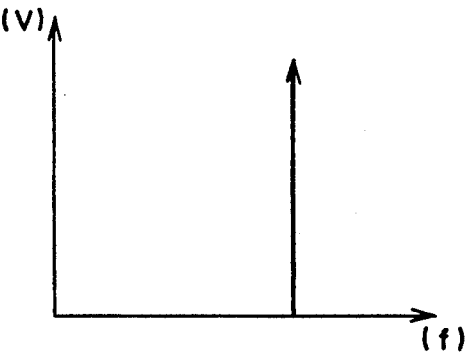

FIG. 16

+3 or −3 COUNTED VALUE OF HIGH THRESHOLD
+2 or −2 COUNTED VALUE OF MIDDLE THRESHOLD
+1 or −1 COUNTED VALUE OF LOW THRESHOLD

| CONTENTS OF SIGNAL | NUMBER OF TIMES INPUT SIGNAL CROSSES THRESHOLD | | | CHARACTERISTICS OF SIGNAL |
|---|---|---|---|---|
| | +3 or −3 | +2 or −2 | +1 or −1 | |
| (a) VOWEL OF VOICE | 6 | 6 | 12 | NUMBER OF TIMES OF CROSSES WITH RESPECT TO COUNTED VALUE OF HIGH THRESHOLD IS DECREASED BUT NOT ZERO. |
| (b) CONSONANT OF VOICE | 0 | 0 | 28 | NUMBER OF TIMES OF CROSSES WITH RESPECT TO COUNTED VALUE OF LOW THRESHOLD IS INCREASED AND THAT WITH THE RESPECT TO COUNTED VALUE OF HIGH THRESHOLD IS NOT COUNTED. |
| (c) TONE | 16 | 16 | 16 | NUMBER OF TIMES OF CROSSES WITH RESPECT TO ALL COUNTED VALUES OF ALL THRESHOLDS IS THE SAME. |
| (d) MODULATED WAVE | 7 | 12 | 18 | NUMBER OF TIMES OF CROSSES WITH RESPECT TO THE COUNTED VALUES OF HIGH, MIDDLE AND LOW THRESHOLDS IS DIFFERENT AND THAT WITH RESPECT TO COUNTED VALUE HIGH THRESHOLD IS INCREASED. |
| (e) LOW LEVEL NOISE | 0 | 0 | 3 | NUMBER OF TIMES OF CROSSES WITH RESPECT TO ALL COUNTED VALUES OF ALL THRESHOLDS IS LOW. |

VOICE/VOICE BAND DATA DISCRIMINATION APPARATUS

BACKGROUND OF THE INVENTION

1. Field of the Invention

The present invention relates to a voice/voice band data discrimination apparatus for discriminating voice/voice band data or the like, more particularly to an apparatus for discriminating voice data so as to create statistical data and to an apparatus for discriminating voice/voice band data in digital speech interpolation (hereinafter called "DSI") and digital circuit multiplication equipment (hereinafter called "DCME").

2. Description of the Prior Art

As a conventional voice/voice band data discriminating apparatus, there- are known two cases according to the purposes.

FIG. 8 is a block diagram showing a conventional voice/voice band data discrimination apparatus employed in DSI and DCME. This apparatus is designed in such a manner as to catch or identify a tone of 2100 Hz set in the head of a FAX and/or modem signal. Similarly, it is also designed so as to catch a specific frequency for identifying a signaling.

A signal employed in each of the DSI and DCME is represented in the form of a digitized PCM (Pulse Code Modulation) signal of 64 kbps. A judgment as to whether or not the signal is represented in analog or digital form offers no essential problem with respect to the intended functions. However, the digital signal is deeply correlated to the apparatus employed in the DSI and DCME which simultaneously deal with a number of channels. Therefore, a description will be made herein of the digital signal by way of example.

An input signal to be transmitted over a telephone line is supplied to an input terminal 1 and divided into two. One of the two signals is inputted to a signal processing unit 13 for the DSI and DCME, and the other thereof is supplied to a tone discriminator 12. The tone discriminator 12 is comprised of filters or the like and detects a single frequency. When the frequency detected at this time is 2100 Hz, it is determined to be voice band data. In other words, it is judged to be a FAX and/or modem signal. Then, the signal processing unit 13 receives the result of determination or discrimination from the tone discriminator 12 to thereby performing processing based on the contents of discrimination.

FIG. 9 is a block diagram showing another conventional example. This is an apparatus of the type wherein the spectrum for an input signal is analyzed and the contour of the spectrum is determined from the arithmetic operation, as shown in FIG. 10, so as to judge it to be a voice sound when a one-sided low frequency is formed, to judge it to be a modulated wave when a one-sided high frequency is formed, and to judge it to be a tone only when a specific spectrum is represented, whereby the contents of the signal is discriminated.

In this apparatus, the input data measuring circuit 14 measures data necessary for the spectrum analysis based on a signal inputted from a signal input terminal 1. Then, the spectrum for the data is determined by a spectrum analysis/arithmetic circuit 15 provided at the stage after the input data measuring circuit 14. Thereafter, a statistical processing circuit 16 performs necessary statistical calculation.

As an alternative to the apparatus used for the above purpose, there is known one in which the number of zero crosses is used as one element for the judgment of the contents of the signal and employed in combination of the same with other functions.

The conventional voice/voice band data discrimination apparatus is constructed as described above. Since the circuit shown in FIG. 8 detects only a signal of 2100 Hz, the modem signal itself cannot be detected. Therefore, a signal from the apparatus with no tone of 2100 Hz set in the head thereof and a modem signal, which appears after the top or head signal of 2100 Hz has passed therethrough, cannot be detected.

The Fourier arithmetic processing is performed to determine the spectrum for the input signal in the circuit shown in FIG. 9. Therefore, its processing becomes complex and the apparatus is large-sized in structure. In particular, the apparatus employed in the DSI and DCME which simultaneously deal with many channels has problems that it becomes large and its manufacturing cost is high.

SUMMARY OF THE INVENTION

With the foregoing problems in view, it is an object of the present invention to provide a voice/voice band data discrimination apparatus which can perform the discrimination of data with high accuracy and can be compacted and manufactured at low cost.

According to one aspect of the present invention, there is provided a voice/voice band data discrimination apparatus characterized in that a prescribed width of a dead zone is set to an input signal supplied over a telephone line so as to count how many times the input signal crosses the dead zone as the number of zero crosses, and the sum of absolute-value voltages of the input signal is determined so as to perform the encoding based on the result thus determined or carry out the average and dispersion analysis of the thus-determined result, thereby identifying the contents of the input signal delivered from the telephone line.

According to another aspect of the present invention, there is provided a voice/voice band data discrimination apparatus characterized in that plurally-stepped thresholds are set to an input signal supplied over a telephone line so as to count how many times the input signal crosses the respective thresholds, thereby performing the encoding based on the result thus determined or effecting the average and dispersion analysis of the thus-determined result, whereby the identification of the contents of the input signal delivered through the telephone line is carried out.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

FIG. 7 is a diagram for describing the characteristics of the waveform of each signal in the voice/voice band data discrimination apparatus according to said one embodiment of the present invention;

FIG. 10 is a diagram for describing the spectrum of each signal;

FIG. 16 is a diagram for describing a counted value of each signal and its characteristic.

DETAILED DESCRIPTION OF THE PREFERRED EMBODIMENTS

One embodiment of the present invention will hereinafter be described with reference to the accompanying drawings.

As an input signal, may be used either an analog or digital signal. However, a digital signal employed in the processing of a plurality of channels will be described herein by way of example.

Figure 1:
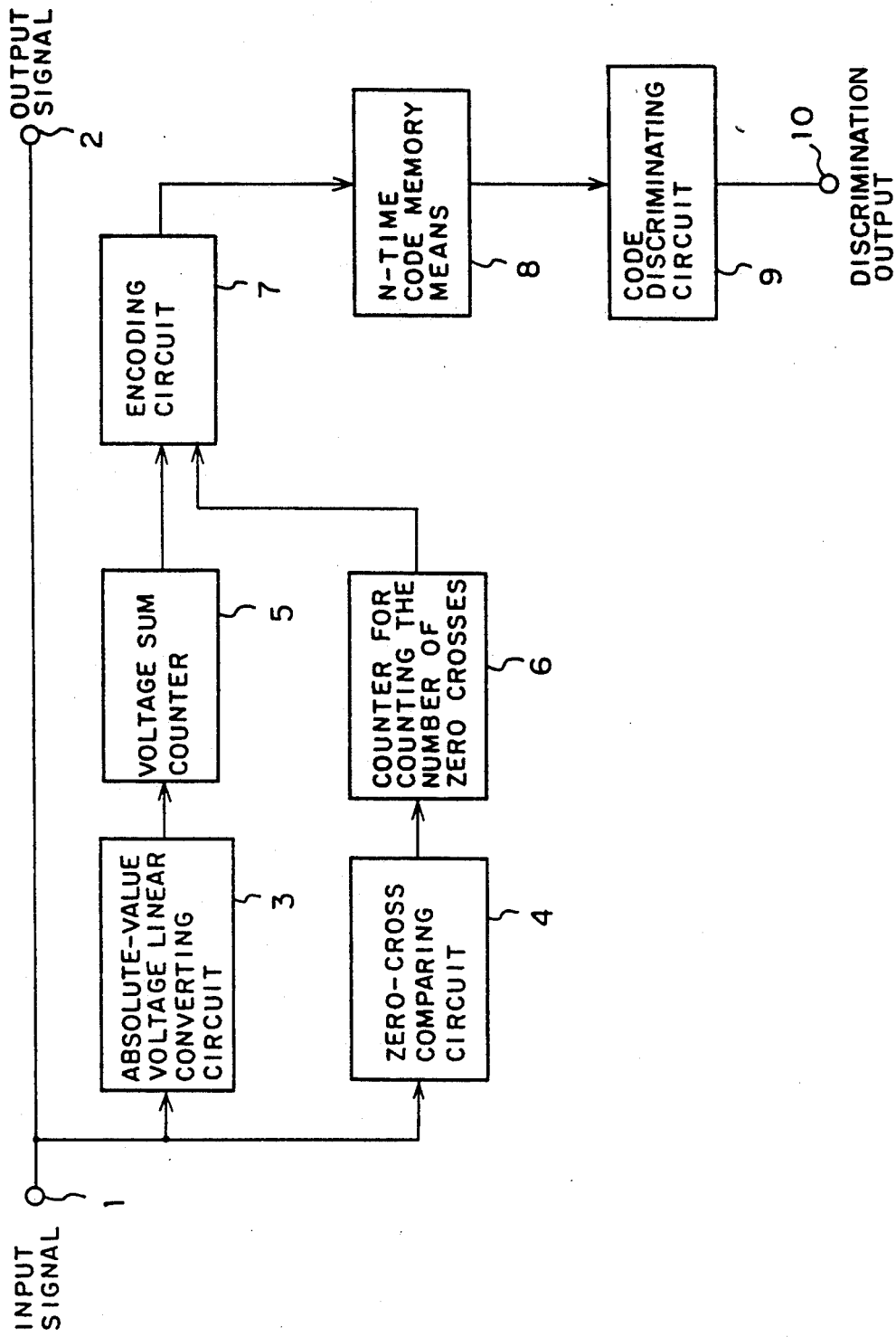
FIG. 1 is a block diagram showing a voice/voice band data discrimination apparatus according to one embodiment of the present invention.
Figure 5:
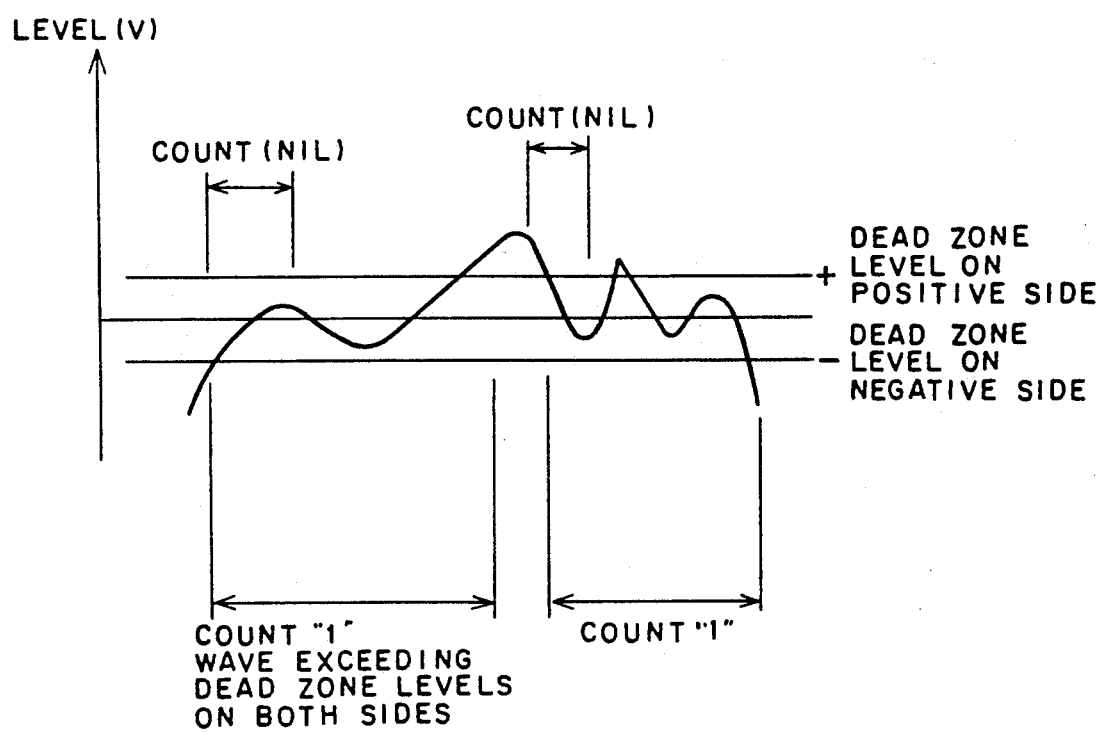
FIG. 5 is a characteristic diagram for describing a dead band or zone in the voice/voice band data discrimination apparatus according to said one embodiment of the present invention.
Figure 6:
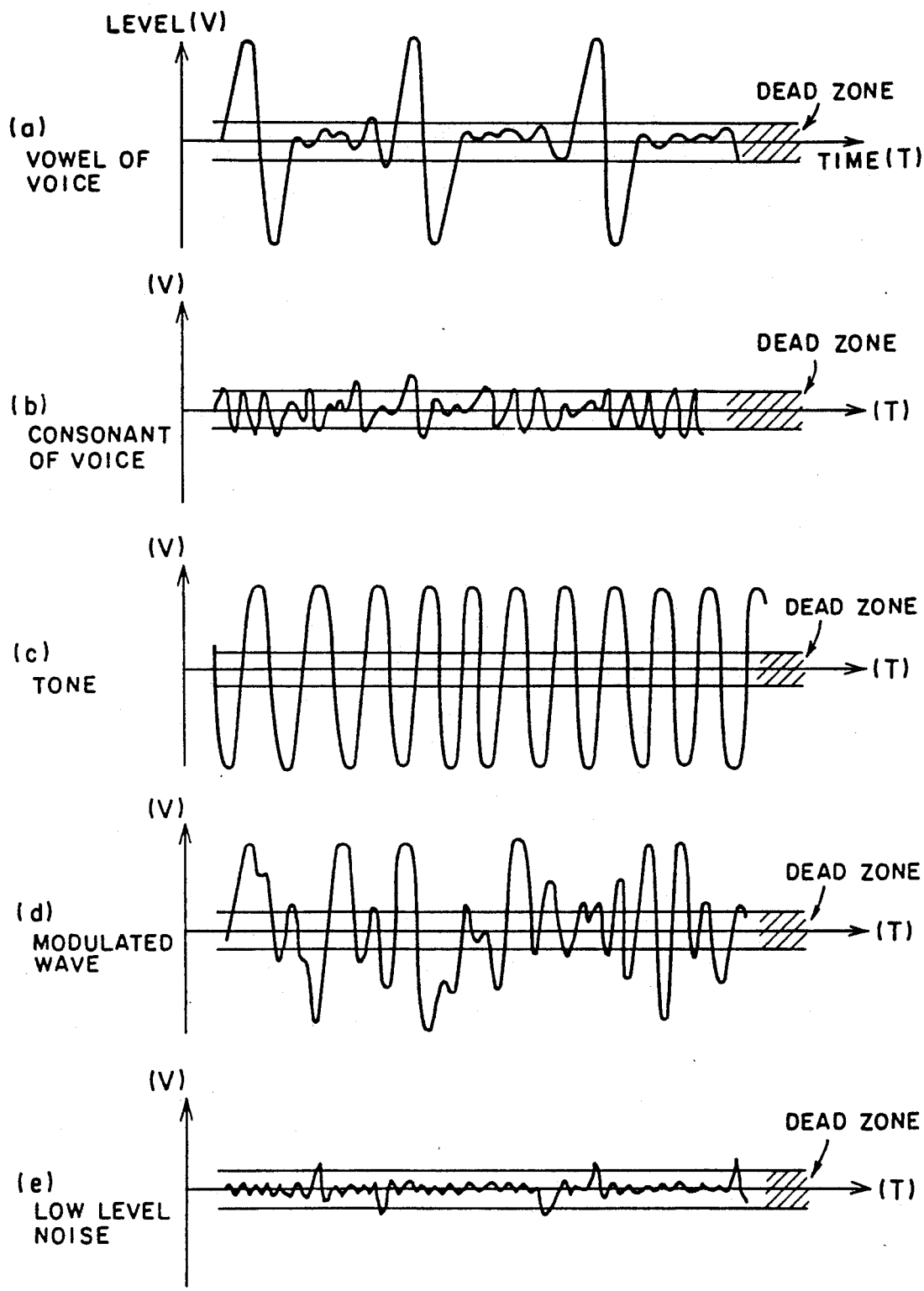
FIG. 6 is a diagram showing the relationship between the dead zone and the waveform of each signal in the voice/voice band data discrimination apparatus according to said one embodiment of the present invention.
Figure 8:
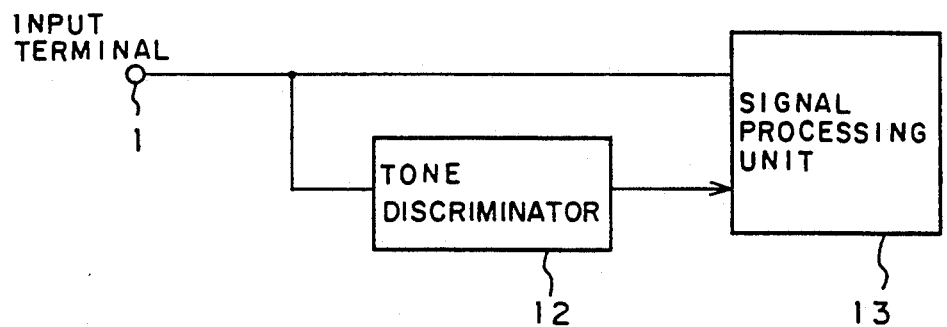
FIGS. 8 is a block diagram showing a conventional voice/voice band data discrimination apparatus.
Figure 9:
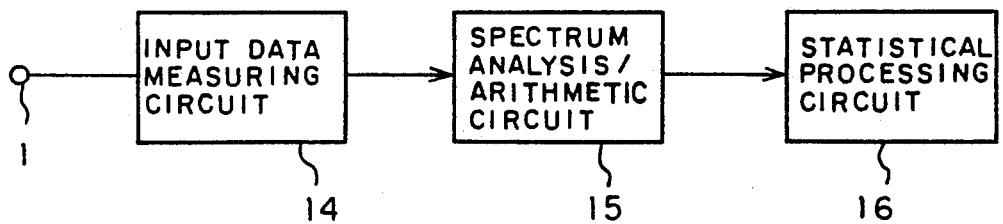
FIG. 9 is a block diagram showing a conventional voice/voice band data discrimination apparatus.

FIG. 1 is a block diagram of a voice/voice band data discrimination apparatus according to one embodiment of the present invention. In the same drawing, designated at numeral 1 is a signal (digital) input terminal connected to a telephone or communication line. Designated at numeral 2 is a signal processing output terminal 2, an output signal from which is subjected to prescribed signal processing by unillustrated DSI, DSME and the like connected to the following stage. Designated at numeral 3 is an absolute-value voltage linear converting circuit 3. The digital signal has normally been encoded in accordance with the code regulation such as A-LAW, and the codes are linearly converted by the absolute-value voltage linear converting circuit 3. Designated at numeral 4 is a zero-cross comparing circuit with a dead-zone function incorporated therein. As shown in FIG. 5, the dead zone is such that dead-zone voltages are set to both sides of positive and negative voltages How many times the input signal crosses the dead zone, is only counted as the number of its zero crosses. Thus, the input signal, which is zero-crossed at the level of a voltage lower than that of the dead zone, is not counted. Based on such a function referred to above, how many times the input signal crosses the dead zone, is counted as the number of zero crosses only when a voltage changes appreciably in the waveform of the voltage.

Designated at numeral 5 is a voltage sum counter which serves to accumulatively add absolute-value voltages converted by the absolute-value voltage linear converting circuit 3. Numeral 6 indicates a counter for counting the number of zero crosses. Designated at numeral 7 is an encoding circuit which converts counted values of the counters 5, 6 into coded form. The values of the counters 5, 6 are defined in the form of the special numeration system according to the contents of an input signal. Therefore, codes are set based on the those values. Designated at numeral 8 is an N-time code memory means which serves to store codes corresponding to N times therein. Designated at numeral 9 is a code discriminating circuit which discriminates the contents of the input signal while observing the manner in which the codes corresponding to N times are concentrated for example. On the other hand, when the codes vary in level, the code discriminating circuit 9 holds a state of the contents previously discriminated and outputs the result of discrimination thereof thus held from a discrimination output terminal 10.

Next, operation of the apparatus will now be described.

(a) Set reference time T to be measured.

The reference time T is required to be counted as the number of the zero crosses in the telephone signal band of 300 Hz to 3400 Hz and to have the length by which the frequency is discriminable. Assuming that the frequency is f, the number of the zero crosses z developed during a predetermined period of time Tsec is given by the following equation:

$$z = 2 \cdot f \cdot T$$

When it is desired to identify the frequency of 50 Hz based on the difference between the number of the zero crosses according to the contents of two signals, for example, the time T to be measured is required to be equal to 20 ms or so. Namely, the frequency of 50 Hz is discriminated by the difference therebetween, i.e., two times.

(b) Determine the sum of absolute-value voltages during the reference time T.

The level of each of a tone and a modem signal with respect to the telephone line is specified, and their level values are greater than a specified value of the human voice. However, the vowel portion of the voice is normally high in level. When the sum of the absolute-value voltages is determined in practice, it is classified into large and small groups according to the contents of each signal as illustrated in an item of "Sum of Absolute-Value Voltages" shown in FIG. 7.

(c) Determine the number of the zero crosses during the reference time T. In this case, the zero crosses of small levels are not counted as the number of the zero crosses under the establishment of the dead zone.

The number of the zero crosses differs with the contents of each signal. If the dead zones for the zero crosses are not provided, the respective signals shown in FIG. 16 have no clear difference in the number of the zero crosses except for the vowel of the voice portion relatively small in the number thereof as described in an item of "Number of Zero Crosses Without Dead Zone", and hence the discrimination of the contents by its item alone is hard.

However, when the dead zones for the zero crosses are provided, the waveform of each signal differs according to the contents thereof, so that a substantially difference occurs in the number of the zero crosses. Namely, as shown in an item of "Number of Zero crosses inclusive of Dead Zone" in FIG. 7, the number of the zero crosses with respect to the voice vowel is decreased but the modulated wave is little decreased. In addition, the tone is not decreased at all.

(d) The encoding is carried out based on preset numerical values, using the sum of the absolute-value voltages and the number of the zero crosses measured during the reference time T.

The features of both the values counted as the sum of the absolute-value voltages and the number of the zero crosses inclusive of the dead zones defined according to the contents of each signal are as follows:

i) Voice (vowel)
  The frequency thereof is low and complex.
  The sum of the voltages is greater as compared with that of the consonant.
  The number of the zero crosses is decreased.

ii) Voice (consonant)
  The frequency thereof is high but its level is low.
  The number of the zero crosses is increased. However, since the consonant is low in level, the number of the zero crosses is decreased due to the provision of the dead zones.
  The sum of the voltages is small. However, since all the consonants are not low in level, all of them cannot be detected.

iii) Tone
  The level and frequency of the tone are high. It is a single frequency.
  The sum of the voltages is large.
  The number of the zero crosses is increased.
  The sum of the voltages and the number of the zero crosses are stable together and they become the same values even when their measurement is made N times continuously.

iv) Modulated wave
  The level and frequency thereof are both high and complex.
  The sum of the voltages is large.
  The number of the zero crosses is increased.
  It has some appropriate variations in level.

v) Low-level noise
  The level thereof is low and its frequency is high.
  The number of the voltages is small.
  The number of the zero crosses is decreased due to the provision of the dead zones.

(e) The number of the zero crosses of each signal is continuously measured during the reference time T. The discrimination of the contents of each signal is made at intervals of one time based on the distribution of codes corresponding to N times, thereby ensuring their discrimination provided that their measurement is successively carried out plural times. However, N times have been determined according to the contents of the signals to be discriminated, respectively.

(f) When the distribution of the codes reaches a predetermined criterion sufficient to discriminate the contents thereof and the discrimination of the contents is made, a discrimination signal is outputted from the discrimination output terminal 10 as the result of their discrimination. On the other hand, when it does not reach the criterion enough to discriminate the contents thereof, a value indicative of the state of the contents previously discriminated is retained.

This is because the discrimination of the contents thereof cannot be performed properly since two kinds signals are measured during transition of each signal. Thus, the previous discrimination value is held in this case.

According to the present embodiment, as described above, only how many times the input signal crosses a predetermined width of each dead zone is measured, as the number of the zero crosses, using the zero-cross comparing circuit 4 having the width of the dead zone defined with respect to the input signal and for comparing its width and the amplitude of the input signal so as to count only how many times the input signal crosses the width of the dead zone, as the number of the zero crosses. Then, the voltage sum counter 5 detects the magnitude of the sum of the absolute-value voltages relative to the input signal, and the encoding circuit 7 creates desired codes based on the output values supplied from the previous stages. Then, the code discriminating circuit 9 is used to discriminate the contents of the codes, thereby discriminating the vowel and consonant of the voice, the tone signal and the frequency thereof, and the modulated wave. It is therefore unnecessary to perform complex processing such as the Fourier transform. In addition, the discrimination of the contents referred to above can be performed in a simple structure and with high accuracy.

Upon discriminating the codes, the N-time code memory means 8 is provided to store codes corresponding to plural times therein and to discriminate the contents of the signal while observing the degree of concentration of the codes corresponding to N times, and the like, thereby making it possible to discriminate the contents thereof more assuredly.

Figure 2:
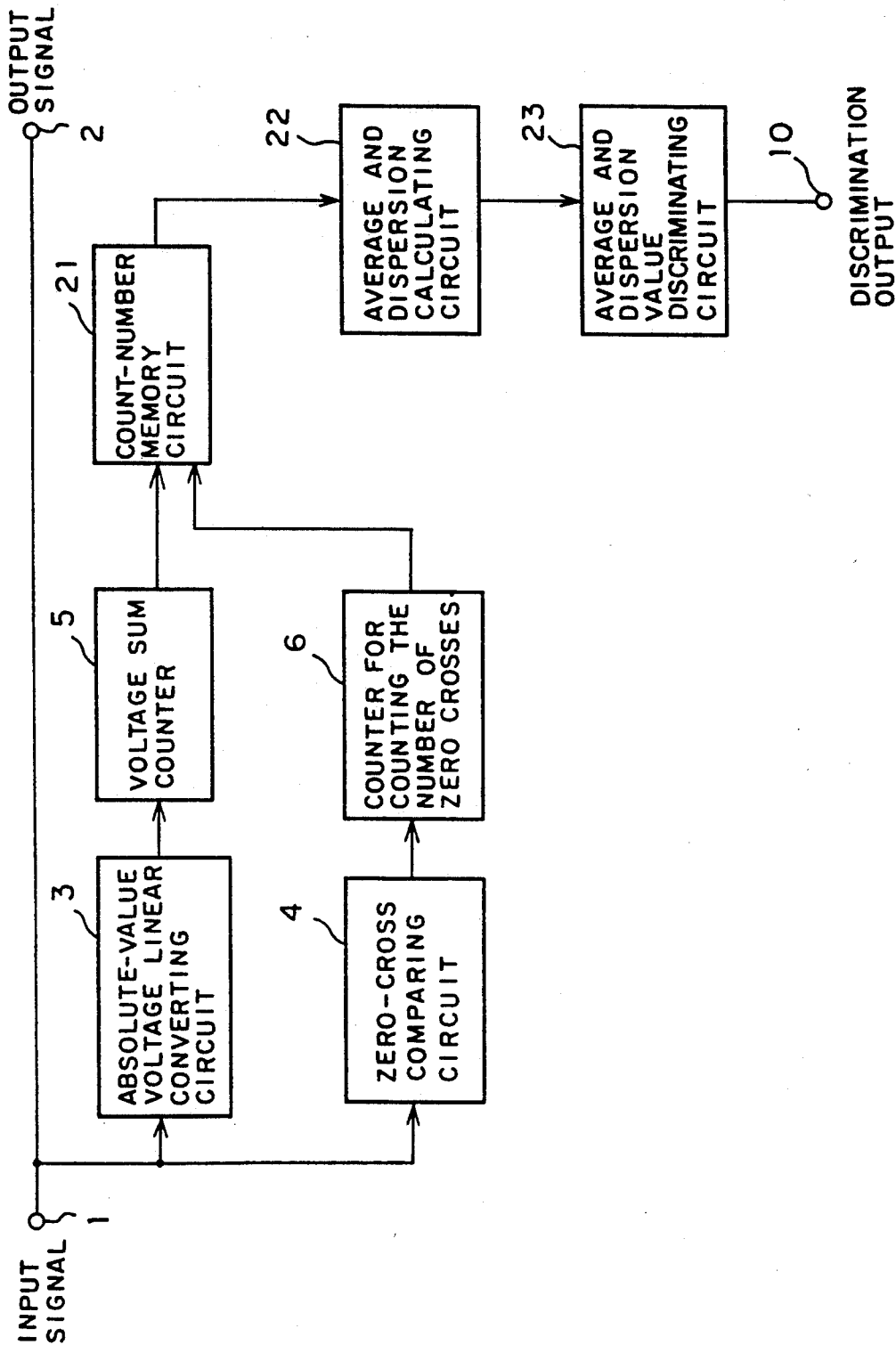
FIG. 2 is a block diagram depicting a voice/voice band data discrimination apparatus according to another embodiment of the present invention.
Figure 3:
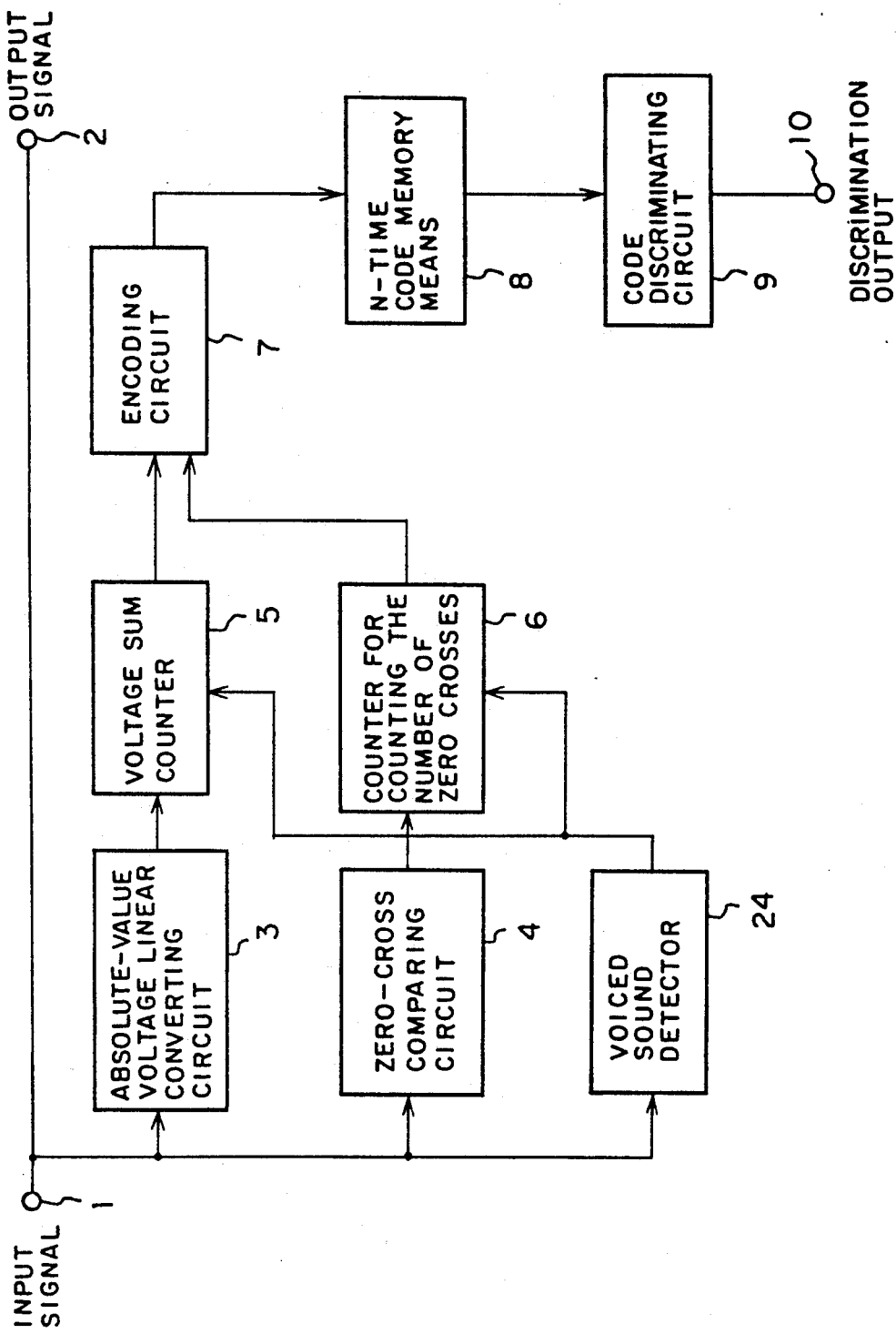
FIGS. 3 is a diagram illustrating modifications of the voice/voice band data discrimination apparatus shown in FIG. 1.
Figure 4:
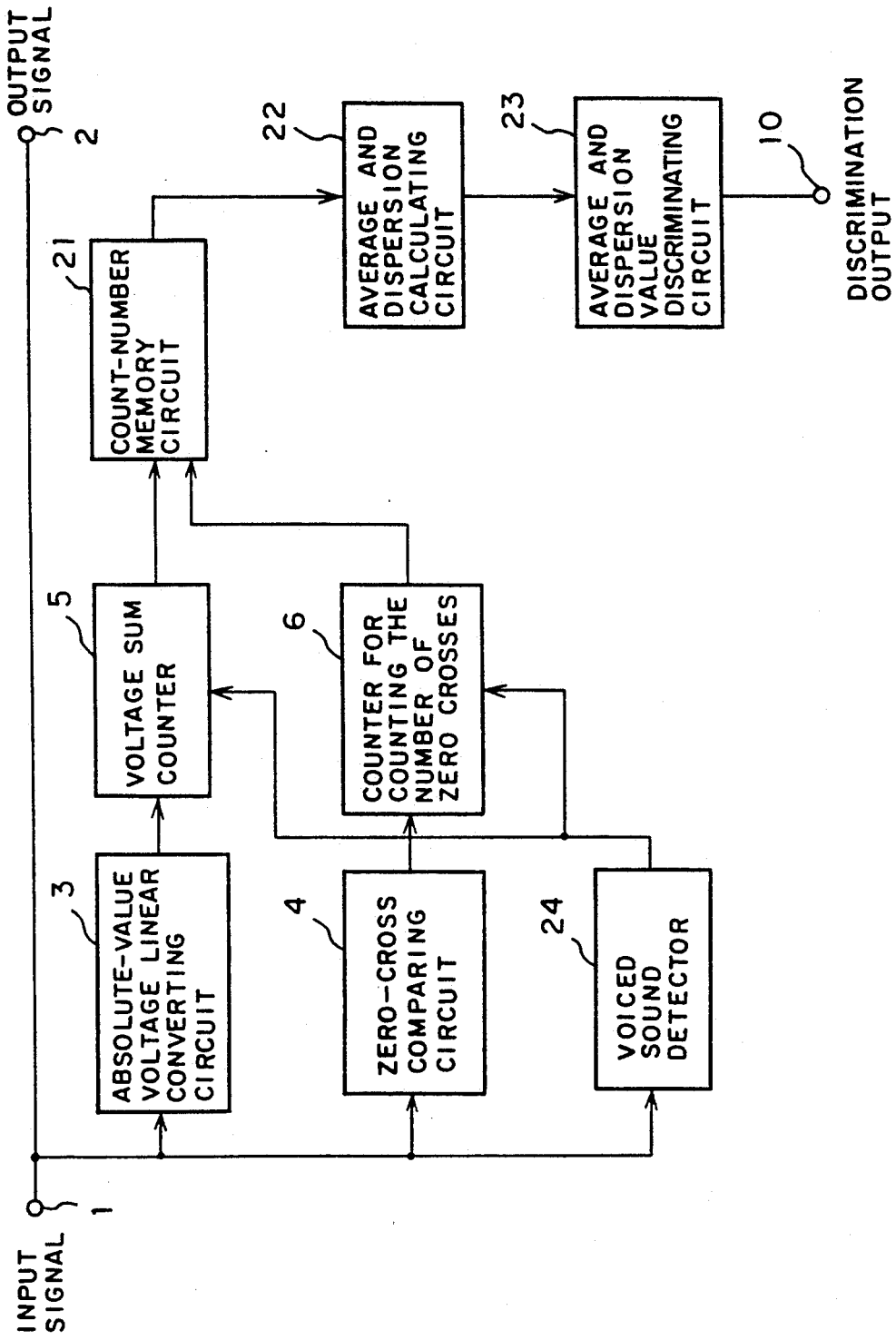
FIG. 4 is a diagram illustrating modifications of the voice/voice band data discrimination apparatus shown in FIG. 2.

A voice/voice band data discrimination apparatus according to a second embodiment of the present invention will next be described with reference to FIG. 2.

As an alternative to the fact that the encoding is made based on the counted values in the circuit of the voice/voice band data discrimination apparatus according to the above-described first embodiment, the second embodiment is so constructed that numerical values are stored in a count-number memory circuit 21, the average and dispersion of counted values corresponding to N times are determined by an average and dispersion calculating circuit 22, and the discrimination and judgment of the contents of an input signal is made based on the so-determined average and dispersion values by an average and dispersion value discriminating circuit 23.

In this case, the circuit is complex more or less but the accuracy in the discrimination is improved as compared with that of the first embodiment described above.

Figure 11:
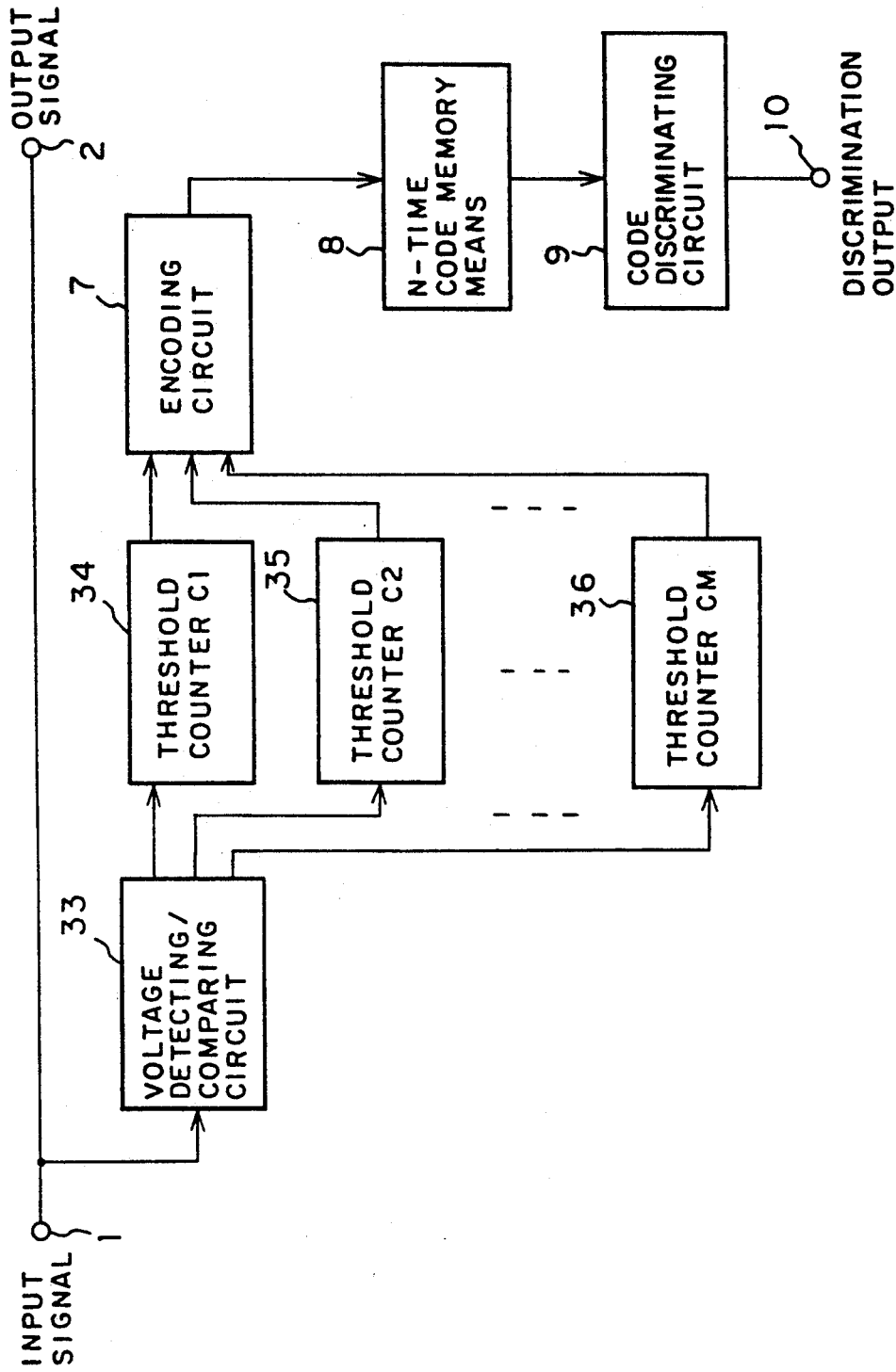
FIG. 11 is a block diagram showing a voice/voice band data discrimination apparatus according to a third embodiment of the present invention.

FIG. 11 is a block diagram of a voice/voice band data discrimination apparatus according to a third embodiment of the present invention. The same reference numerals as those shown in FIG. 1 designate the same or similar parts. Designated at numeral 33 is a voltage detecting/comparing circuit, and numerals 34, 35, 36 indicate counters C1, C2, CM, respectively. The voltage detecting/comparing circuit 33 stores a value of a previous voltage therein, and determines whether or not an input signal exceeds the preset threshold newly. If it is determined to be positive, pulses are supplied to an associated counter out of the counters provided at the stage after the voltage detecting/comparing circuit 33. Then, the associated counter counts the number of the pulses. Designated at numeral 7 is an encoding circuit which performs the encoding based on the numerical values of the respective threshold counters C1, C2, CM. At this time, the values of the these counters are defined in the form of the special numeration system according to the contents of the signal. Therefore, codes are set based on those values. Designated at numeral 8 is an N-time code memory circuit which serves to store codes corresponding to N times therein. Designated at numeral 9 is a code discriminating circuit which discriminates the contents of the signal while observing the manner in which the codes corresponding to N times are concentrated for example. On the other hand, when the codes vary in level, the code discriminating circuit 9 holds a state of the contents previously discriminated and outputs the result of discrimination of the contents from a discrimination output terminal 10.

Next, operation of the apparatus will now be described.

(a) Set the reference time T in the same manner as the above-described embodiment.

(b) Set the threshold voltage in the form of plural steps.

Figure 15:
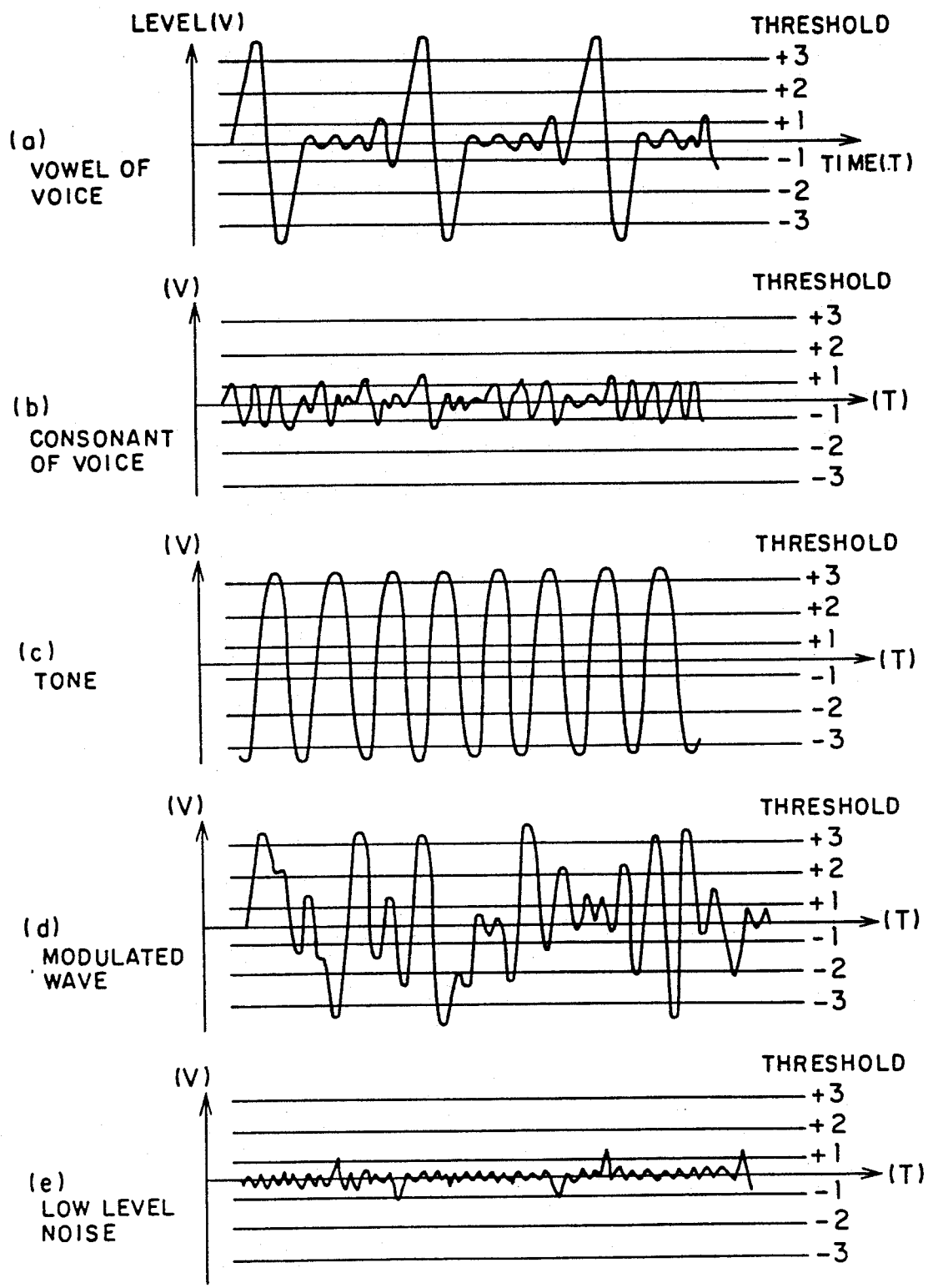
FIG. 15 is a diagram showing the relationship between the waveform of each signal and each threshold.

As shown in FIG. 15, the threshold is set to be M=six steps (the range from +3 to −3).

The level of each of a tone and a modem signal with respect to the telephone line is specified, and their level values are greater than a specified value of the human voice. The waveform of each of the tone and modem signal is different from the others.

(c) Determine the number of crosses of the input signal exceeding each threshold during the reference time T.

Read the number of the crosses of each input signal at each threshold. The characteristics of such a signal as shown in FIG. 15 can be summarized as illustrated in FIG. 16.

(d) The encoding is carried out based on preset numerical values, using the number of the crosses of each signal exceeding each threshold, which is determined during the reference time T. The basic discrimination of the contents of each signal is performed, and codes are set based on the characteristic of a counted value of each threshold according to the contents of each signal.

i) Voice (vowel)

The frequency thereof is low and complex.

The number of times of crosses with respect to counted values (+3, −3) of the high threshold is small but not zero.

The number of times of crosses with respect to counted values (+1, −1) of the low threshold is greater than that with respect to the high threshold.

ii) Voice (consonant)

The frequency thereof is high but its level is low.

The number of times of crosses with respect to the counted values of the high threshold is zero or extremely small, and that with respect to the low threshold becomes greater.

iii) Tone

The level and frequency of the tone are high. It is a single frequency.

The number of times of crosses with respect to the counted values of the high, middle and low thresholds is large and becomes substantially the same values.

It is substantially the same values even when their measurement is made N times continuously.

iv) Modulated wave

The level and frequency thereof are high and complex.

The number of times of crosses with respect to the counted values of the high, middle and low thresholds is large but different from each other.

v) Low-level noise

The level thereof is low and its frequency is high.

The number of times of crosses with respect to the counted value of the high and middle thresholds is substantially zero.

Since the level thereof is low, it does not reach even the low threshold and becomes a small value.

The subsequent operation is the same as the operations of (e) and (f) in the first embodiment, and its description will therefore be omitted.

According to the present embodiment, as described above, the number of the crosses of the input signal with respect to the preset respective thresholds is determined by making use of the voltage detecting/comparing circuit 33 in which the threshold is set in plural steps (six steps) with respect to the input signal. The result of determination of the number of the crosses is inputted to the encoding circuit 7 to be encoded. Then, the code discrimination circuit 9 is used to discriminate the encoded contents, thereby discriminating the vowel and consonant of the voice, the tone signal and the frequency thereof, and the modulated wave. Therefore, the discrimination of the contents referred to above can be performed with higher accuracy although the present embodiment is slightly complex in structure as compared with the above-described embodiment.

Figure 12:
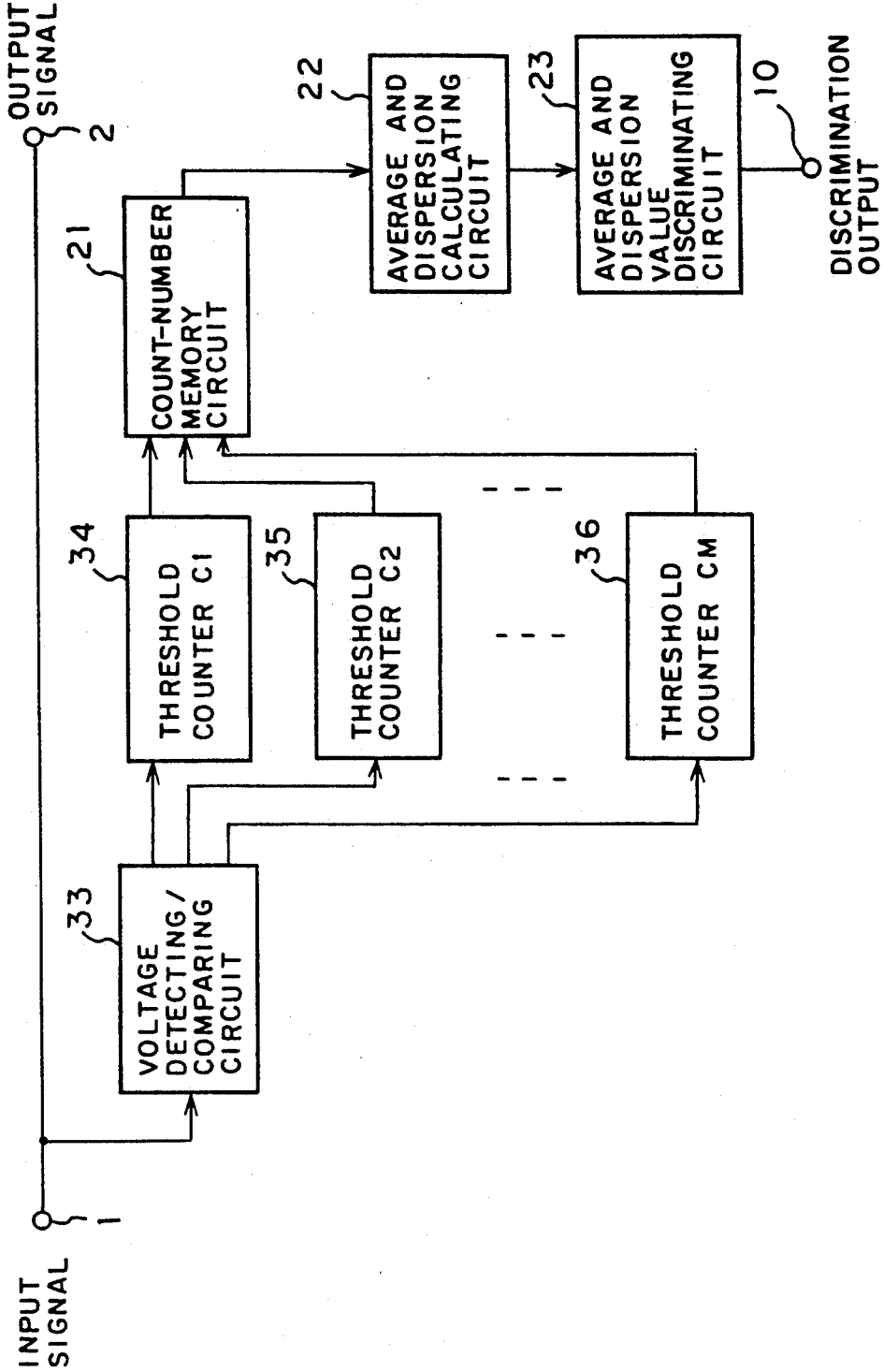
FIG. 12 is a block diagram depicting a voice/voice band data discrimination apparatus according to a fourth embodiment of the present invention.
Figure 13:
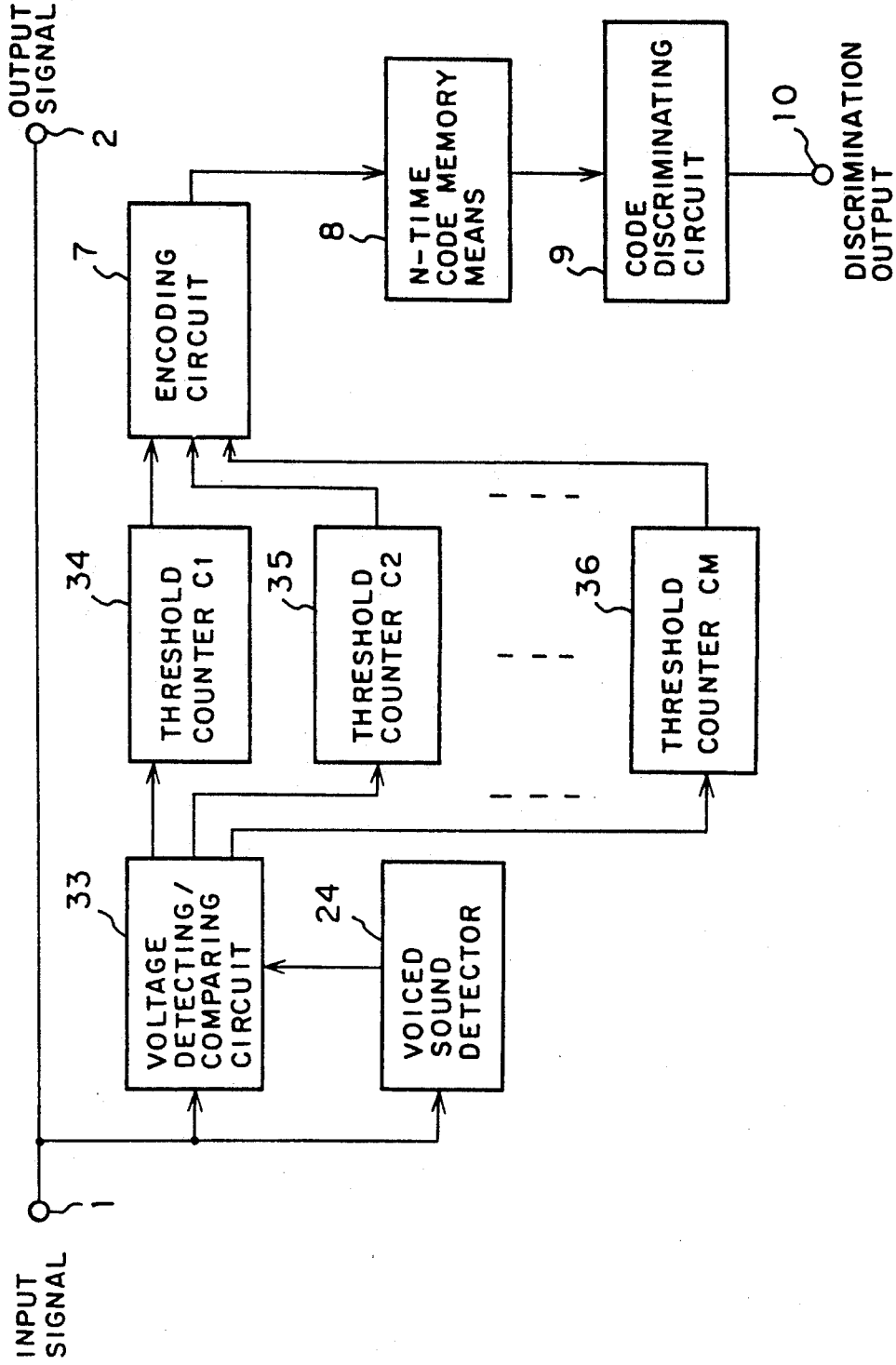
FIGS. 13 and 14 are diagrams showing modifications of the voice/voice band data discrimination apparatus shown in FIGS. 11 and 12, respectively.
Figure 14:
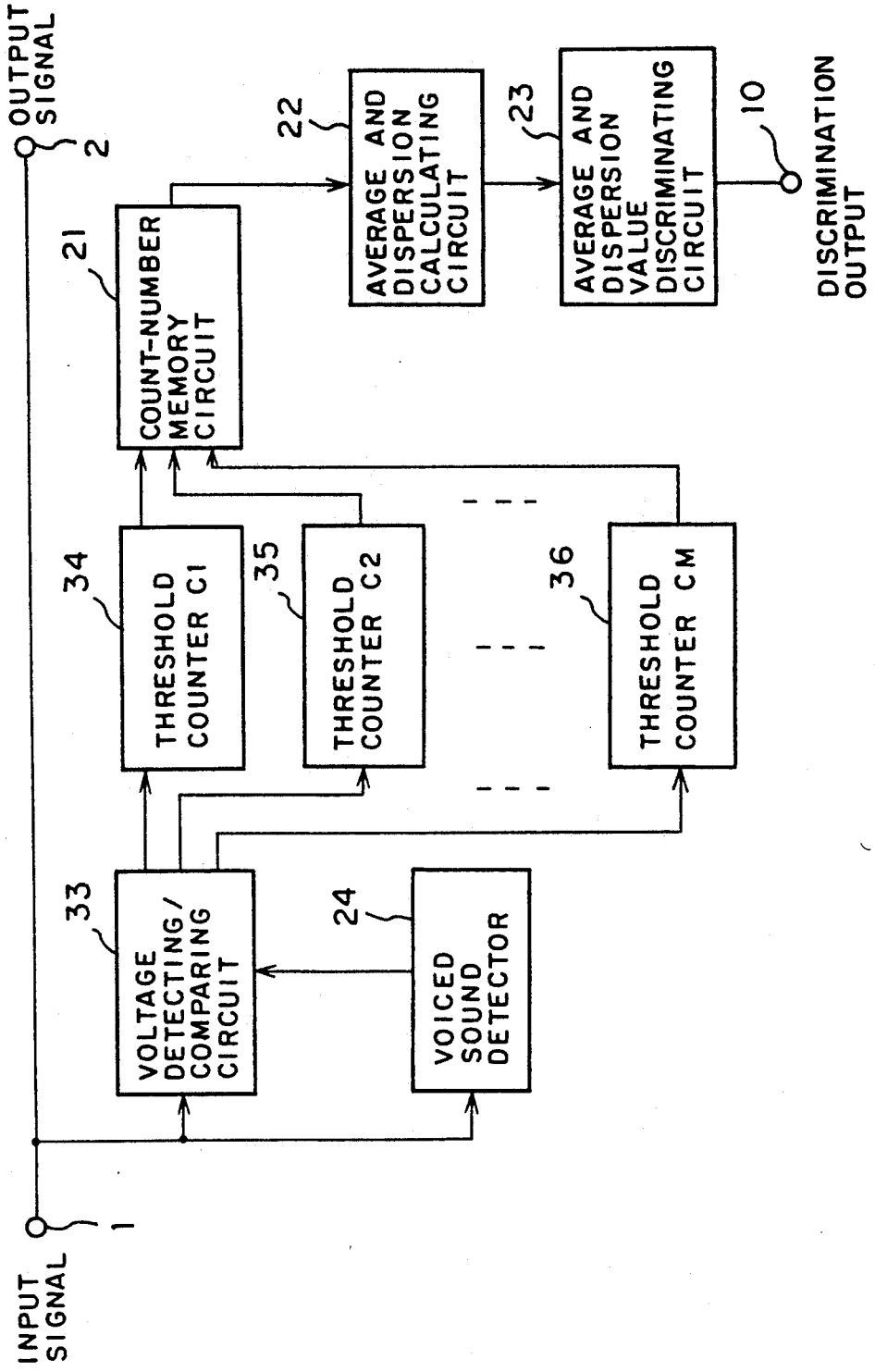

FIG. 12 is a block diagram of a voice/voice band data discrimination apparatus according to a fourth embodiment of the present invention. As an alternative to the practice of the encoding based on the counted values, the present embodiment is so constructed that a count-number memory circuit 21 stores numerical values therein, an average and dispersion calculating circuit 22 determines the average and dispersion of counted values corresponding to N times, and an average and dispersion value discrimination circuit 23 performs the discrimination and judgment of the contents of an input signal based on the so-determined average and dispersion values. In doing so, the data discrimination can be performed with higher accuracy.

Incidentally, although the discrimination of the contents of the signal is not performed in particular in such a manner that the separation between the voice and portions other than the voice is made, in each of the above-described embodiments, both of the voice and voice band data and intermittently inputted as signals. Thus, the discrimination of the contents effected exclusive of a period in which the input signal is absent rather brings about higher accuracy. Therefore, a voiced sound detector 24 for detecting the voiced sound based on the sum of the absolute-value voltages may be provided to discriminate the contents only when the voiced sound is detected from the input signal. In addition, in this case, the false detection of the voiced sound can be reduced by detecting the vowel rather than the consonant, thereby further ensuring the detection of the voiced sound.

FIGS. 3 and 4 and FIGS. 13 and 14 are block diagrams of the circuits in the first, second, third and fourth embodiments in which the voiced sound detectors 24 each for detecting the voiced sound based on the sum of the absolute-value voltages are provided.

According to the voice/voice band data discrimination apparatus of the present invention, as has been described above, the prescribed width of the dead zone is set to the input signal delivered from the telephone line, and a comparison is made between its width and the amplitude of the input signal so as to count only how many times the input signal crosses the width of each dead zone, as the number of the zero crosses. Then, the sum of the absolute-value voltages of the input signal is determined and the encoding is performed based on the values corresponding to the sum thereof thus determined or-the average and dispersion analysis of the values is carried out, thereby effecting the discrimination of the vowel and consonant of the voice, the tone signal and the frequency thereof, and the modulated wave. The apparatus can therefore bring about advantages that the complex processing such as Fourier transform is not required, the contents of the input signal supplied through the telephone line can be identified with high accuracy in a simple circuit arrangement, and in particular the circuit arrangement can be realized at a low cost where the signal processing is performed simultaneously with respect to a number of channels as in the case of the DSI and DCME.

Further, the number of the crosses of the input signal with respect to the threshold set in the form of plural steps is determined with respect to the input signal transmitted over the telephone line. Then, the encoding is made based on the result of determination of the number of the crosses- or the average and dispersion analysis of the values is performed, thereby discriminating the vowel and consonant of the voice, the tone signal and the frequency thereof, and the modulated wave. Therefore, the discrimination of the contents of the input signal can be performed with higher accuracy.

Having now fully described the invention, it will be apparent to those skilled in the art that many changes and modifications -can be made without departing from the spirit or scope of the invention as set forth herein.

What is claimed is:

1. A voice/voice band data discrimination apparatus for discriminating voice and/or voice band data transmitted over a telephone line in combination of an audible sound, a signaling used with a sine wave of a single frequency or sine waves of a plurality of frequencies, and voice band data used with a modulated wave, said apparatus comprising:

zero-cross comparing means having a predetermined width of a dead zone represented by preselected signal magnitude values above and below the zero signal level with respect to the voltage of an input signal to said zero-cross comparing means and for comparing the width of the dead zone and the amplitude of the input signal so as to count only how many times the input signal crosses the width of the dead zone, as the number of the zero crosses;

zero-cross number counting means for counting the number of zero crosses in response to the output of said zero-cross comparing means;

absolute-value voltage linear converting circuit means for converting absolute-value voltages from said input signal;

absolute-value voltage sum counting means for counting the sum of absolute-value voltages of the input signal;

encoding means for producing codes based on values counted by said zero-cross number counting means and said absolute-value voltage sum counting means in response to the outputs of said zero-class number counting means and said absolute-value voltage sum counting means;

memory means for storing the output of said encoding means therein; and code discriminating means responsive to the output of said memory means for outputting a discrimination signal therefrom while observing the contents of the codes during a selected reference time period as set for measurement.

2. A voice/voice band data discrimination apparatus according to claim 1, further comprising a voiced sound detecting means for detecting a voiced sound from the sum of the absolute-value voltages of the input signal.

3. A voice/voice band data discrimination apparatus for discriminating voice and/or voice band data transmitted over a telephone line in combination of an audible sound, a signaling used with a sine wave of a signal frequency or sine waves of a plurality of frequencies, and voice band data used with a modulated wave, said apparatus comprising:

zero-cross comparing means having a predetermined width of a dead zone represented by preselected signal magnitude values above and below the zero signal level with respect to the voltage of an input signal to said zero-cross comparing means and for comparing the width of the dead zone and the amplitude of the input signal so as to count only how many times the input signal crosses the width of the dead zone, as the number of the zero crosses;

zero-cross number counting means for counting the number of zero crosses in response to the output of said zero-cross comparing means;

absolute-value voltage linear converting circuit means for converting absolute-value voltages from said input signal;

absolute-value voltage sum counting means for scouting the sum of absolute-value voltages of the input signal;

average/dispersion calculating means responsive to the outputs of said zero-cross number counting means and said absolute-value voltage sum counting means for calculating the average and the degree of dispersion of values obtained by counting the outputs thereof a selected number of times with respect to the input signal; and average/dispersion value discriminating means responsive to the output of said average/dispersion calculating means for carrying out the average and dispersion analysis of counted values during a selected reference time period as set for measurement so as to output a discrimination signal therefrom.

4. A voice/voice band data discrimination apparatus according to claim 3, further comprising a voiced sound detecting means for detecting a voiced sound form the sum of the absolute-value voltages of the input signal.

5. A voice/voice band data discrimination apparatus for discriminating voice and/or voice band data transmitted over a telephone line in combination of a voice sound, a signaling used with a sine wave of a single frequency or sine waves of a plurality of frequencies, and voice band data used with a modulated wave, said apparatus comprising:

voltage detecting/comparing means responsive to an input signal for determining whether or not the input signal exceeds a plurality of preset thresholds;

a plurality of counters provided according to said plurality of preset thresholds respectively;

encoding means responsive to the outputs of said plurality of counters for creating codes based on values of the outputs of said respective counters;

memory means for storing the output of said encoding means therein; and code identifying means responsive to the output of said memory means for outputting a discrimination signal therefrom while observing the contents of the codes during a selected time period as set for measurement.

6. A voice/voice band data discrimination apparatus according to claim 5, further comprising a voiced sound detecting means for detecting a voiced sound from the sum of the absolute-value voltages of the input signal.

7. A voice/voice band data discrimination apparatus for discriminating voice and/or voice band data transmitted over a telephone line in combination of a voice sound, a signaling used with a sine wave of a single frequency or sine waves of a plurality of frequencies, and voice band data used with a modulated wave, said apparatus comprising:

voltage detecting/comparing means responsive to an input signal for determining whether or not the input signal exceeds a plurality of preset signal thresholds set in said voltage detecting/comparing means;

a plurality of counters provided according to said plurality of preset signal thresholds respectively;

count-number memory means for storing the outputs of said plurality of counters therein;

average/dispersion calculating means for calculating the average and the degree of dispersion of values obtained by counting the outputs of said plurality of counters a selected number of times with respect to the input signal; and average/dispersion value discriminating means responsive to the output of said average/dispersion calculating means for carrying out the average and dispersion analysis of counted values during a selected reference time period as set for measurement so as to output a discrimination signal therefrom.

8. A voice/voice band data discrimination apparatus according to claim 7, further comprising a voiced sound detecting means for detecting a voiced sound from the sum of the absolute-value voltages of the input signal.

* * * * *

UNITED STATES PATENT AND TRADEMARK OFFICE
CERTIFICATE OF CORRECTION

PATENT NO. : 5,295,223
DATED : March 15, 1994
INVENTOR(S) : Kazuo Saito

It is certified that error appears in the above-indentified patent and that said Letters Patent is hereby corrected as shown below:

On the cover, in the U.S. Patent Documents section, "5,082,673" should be --5,081,673--.

Col. 2, line 55, "which-" should be --which--.

Col. 3, line 16, "FIGS." should be --FIG.--.

Col. 10, line 4, "class" should be --cross--.

Col. 10, line 58, "form" should be --from--.

Signed and Sealed this

Sixth Day of September, 1994

Attest:

BRUCE LEHMAN

Attesting Officer

Commissioner of Patents and Trademarks